April 27, 1965  J. M. LIEBIG  3,180,650
SPLIT-RING OIL SEAL WITH REINFORCING ELEMENT
Filed May 29, 1963  2 Sheets-Sheet 1
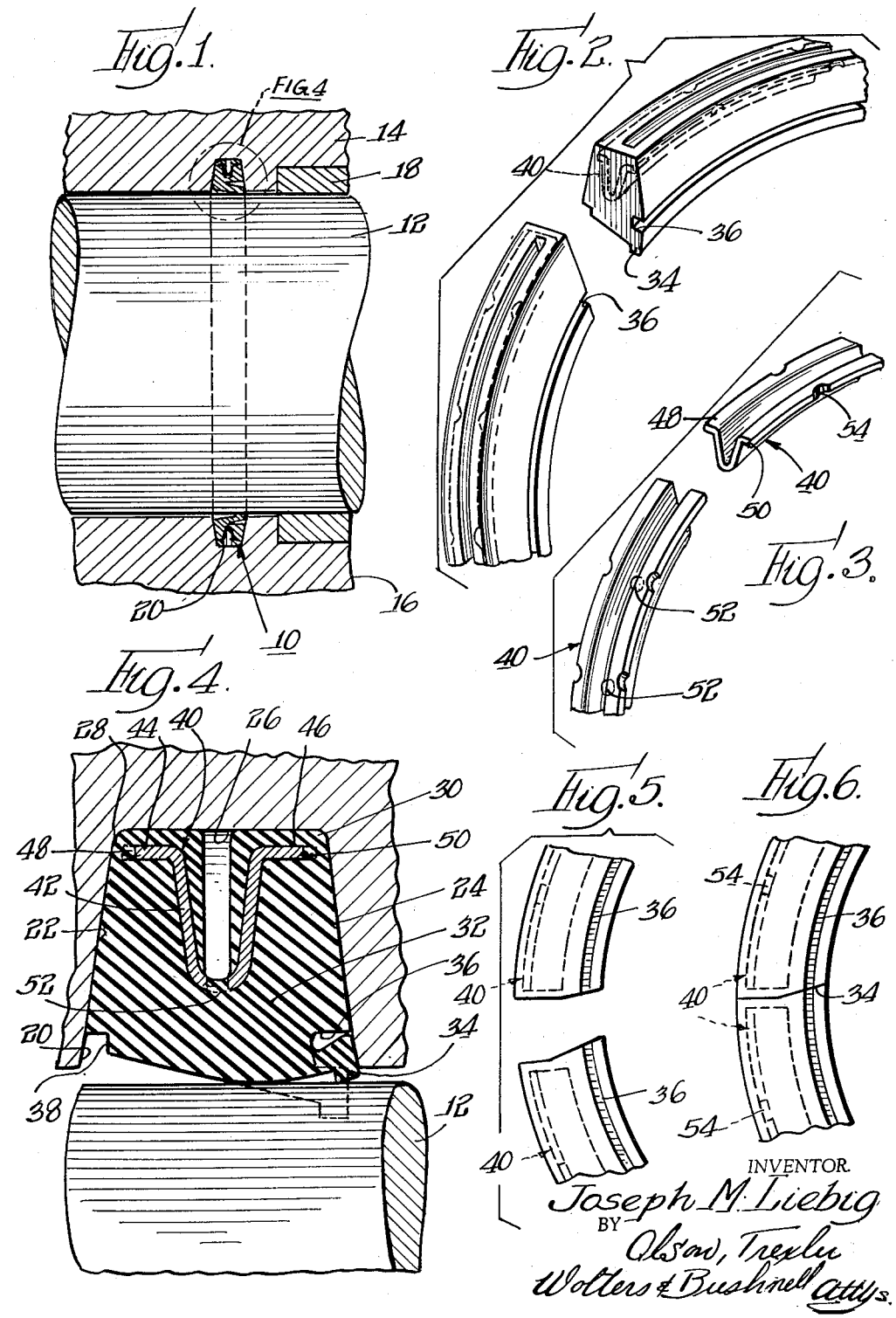

April 27, 1965    J. M. LIEBIG    3,180,650
SPLIT-RING OIL SEAL WITH REINFORCING ELEMENT
Filed May 29, 1963    2 Sheets-Sheet 2
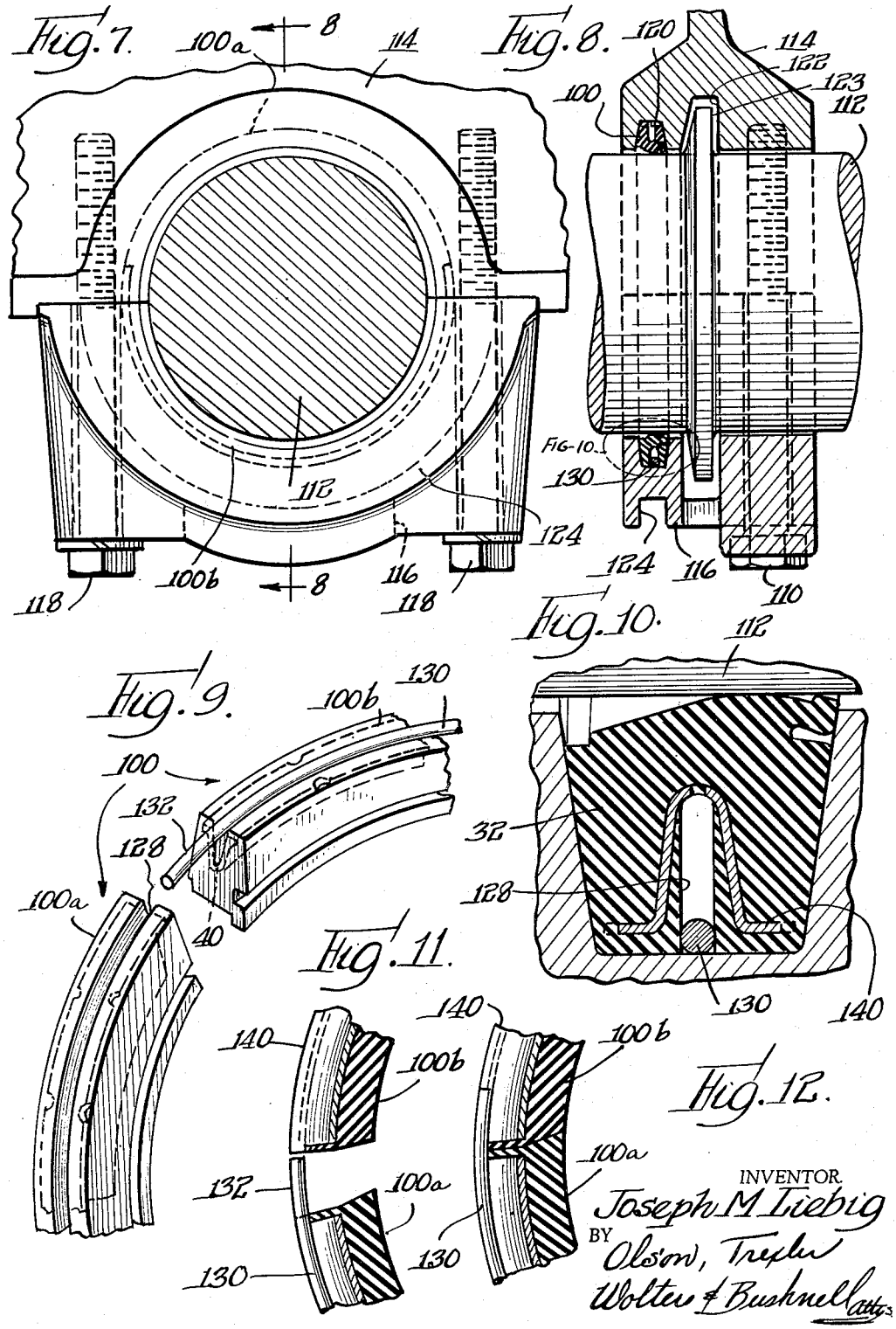

United States Patent Office 3,180,650
Patented Apr. 27, 1965

3,180,650
SPLIT-RING OIL SEAL WITH REINFORCING ELEMENT
Joseph M. Liebig, Wheaton, Ill., assignor to Illinois Milling, Inc., Chicago, Ill., a corporation of Illinois
Filed May 29, 1963, Ser. No. 284,259
9 Claims. (Cl. 277—206)

The present invention relates to fluid seals and is particularly concerned with fluid seals use for sealing crankcases of internal combustion engines or the like. The present case is a continuation-in-part of my copending application, Serial No. 268,773, filed March 28, 1963, now abandoned.

The automobile engine has undergone in the last decade a series of developments and refinements certain of which have been directed to providing an engine of shorter length. In that connection it has been found that members on the "lower end" of the motor, i.e., crankshaft, bearing caps and rod ends, have been reconsidered with a view toward reducing their width as measured axially of the crankshaft. It has been found that the rear main bearing cap lends itself particularly to a reduction in width (as measured axially of the crankshaft) and this finding has made desirable a reduction in space designed for the rear main oil seal. Thus it has been found advantageous to employ narrow oil seals in the interest of (among others) shortening the length of the automobile engine.

For purposes of rapid assembly of the engine parts the rear oil seals are commonly of split construction, viz. the seal being constructed in two halves of 180 degrees each. At the time of motor assembly, with the engine block inverted, one half of the rear seal is pressed into an oil seal support groove in the block. Thereafter the crankshaft assembly is laid in place, a sealing surface of the previously inserted oil seal half encircling the crankshaft.

A subsequent assembly step is the placement of the rear main bearing cap, including the remaining half of the oil seal. The remaining half of the oil seal is carried, of course, by the rear main bearing cap. At this assembly step a functional difficulty may arise if the oil support groove in the bearing cap is not matched perfectly with the support groove in the block. If there should be misalignment between the respective support grooves, there will be offsetting of the sealing surface along the two butt joints of the split oil seal. It is to be understood that in present oil seal constructions of the variety contemplated herein, the sealing surface which engages the rotatable crankshaft is not as wide as that provided by Oakum or impregnated fiber type packings which have been used in the wider support grooves common in certain prior engine constructions. Thus in narrow oil seal constructions where misalignment exists between the bearing cap and engine block, there may be provided at the butt joints of the seal an avenue for oil escape. Where the alignment is true the foregoing difficulties are avoided.

Thus the gist of the problem relates to obtaining proper positioning of the bearing cap with respect to the engine block. A pair of bolts which commonly secure the bearing cap to the block will not suffice to adequately locate the parts being that the accumulated tolerances in the bolts, threaded and non-threaded apertures therefor is too great to provide the desired degree of exactness. A dowel pin between the bearing cap and block has been successfully employed to maintain alignment between these parts, but the dowel pin requires an undesirably wide bearing cap structure which tends to defeat the object of the shortening of the engine length. Further, a dowel when used for locating purposes is a part which serves its function only at the time of assembly of the bearing cap to the block and perhaps may be considered an extravagance.

Manufacturers have used a machined surface surrounding the circular opening defined by the bearing cap and block to permit alignment of the oil support groove by manual feeling. Here it is to be understood that this surface machining is rendered at the same time the oil groove is machined into the temporarily bolted together bearing cap and block. But as to this machined surface, it is costly and serves a useful function principally at the time of motor assembly.

With the foregoing as a background it is the purpose of the present invention to provide an oil seal of the split-ring variety which serves in assembling the motor to locate the bearing cap with respect to the motor block and also insures proper alignment of the oil seal surface at the two joints of the split seal structures.

Another object of the invention is to provide a new and improved split-ring oil seal adapted to preclude offsetting of the sealing surface at the butt joints between the seal halves.

To most advantageously carry out the objectives, a modification is made in the assembly sequence of the bearing cap and the split seal half associated therewith. Specifically, after one half-section of the seal has been inserted in the block and the crankshaft fitted in place, as has been described, it will be understood that the two free ends of the fitted seal-half which straddle the crankshaft are exposed usually flush with the machined flat surface of the block. The second half of the seal, by itself, is then fitted over the crankshaft, each end of the second half of the seal having projecting therefrom means which are received into complementary openings in the fitted first half-seal. In the preferred embodiment, the projecting means is a curved wire held by the second half-seal just below the outer periphery thereof. The opening in the first half of the seal is a continuous fissure along its outer periphery. Thus arranged, the split seal is self-supporting for assembly purposes, and the sealing surface is continuous and aligned precisely at the butt joints as is most desirable. When the second half-seal is secured in place about the crankshaft and interconnected to the first half-seal, the bearing cap is easily fitted over the second half-seal. Thus the split oil seal itself serves as a means for locating the bearing cap during engine assembly. No dowel pins are necessary. No machined locating surface is required.

In achieving the foregoing objects, a rigid reinforcing member of the oil seal structure plays an important role as will be unfolded below in more particularity. Suffice it to say at this point that the rigid reinforcing member provides a holding faculty for the interconnecting means as well as to define the circumferentially extending fissure in the seal-half carried by the engine block.

Still another object of the invention is to provide a fluid seal which includes a circular body of elastomeric material internally reinforced to maintain a high degree of circularity especially along the outer periphery of said body and to afford a substantial measure of lateral or axial peripheral support therealong.

Yet another object of the invention is to provide a fluid seal of the class described wherein the arrangement of an internally disposed reinforcement is such as to permit close dimensional tolerances laterally across the outer periphery of the seal.

A further object is to provide a fluid seal in accordance with the foregoing objects wherein a large area of bonded contact is afforded between an internally disposed reinforcement member and its surroundings of elastomeric seal material, whereby the likelihood of relative movement between the seal material and the reinforcement member is reduced to a minimum.

Further features of the invention pertain to the particular arrangement of the fluid seal whereby the above-outlined and additional operating features are attained.

The invention, both as to its organization and functional aspects, together with further objects and advantages, will best be understood by reference to the following specification taken in connection with the accompanying drawings wherein like reference numerals designate like parts throughout, in which:

FIGURE 1 of the drawings is a fragmentary, sectional view taken in an axial or longitudinal direction along a crankshaft or other rotatable member to be sealed, such rotatable member being shown in cooperative association with a first form of fluid seal of the present invention;

FIG. 2 is an enlarged, fragmentary, perspective view of the seal of FIG. 1;

FIG. 3 is a view like FIG. 2 showing a seal reinforcement means disembodied from the fluid seal;

FIG. 4 is a greatly enlarged, sectional view of the circled portion in FIG. 1;

FIG. 5 is a fragmentary radial view of the seal showing an end construction of a split-type seal, the ends being illustrated in a spaced apart relationship;

FIG. 6 is a view like FIG. 5 showing the ends of the split-type seal in operative abutting relationship;

FIG. 7 is a fragmentary, sectional view taken in a radial or lateral direction through an engine and crankshaft and showing in broken lines a second form of fluid seal of the present invention;

FIG. 8 is a fragmentary, sectional view taken in the direction of the arrows along the line 8—8 of FIG. 7;

FIG. 9 is an enlarged, fragmentary perspective view of the second form of seal shown in FIG. 7;

FIG. 10 is a greatly enlarged, sectional view of the circular portion in FIG. 8;

FIG. 11 is a fragmentary radial view of the seal of FIG. 7, the ends being illustrated in a spaced apart relationship; and FIG. 12 is a view like FIG. 11 showing the end joint of the split-type seal in operative butting relationship.

There is shown in FIG. 1 of the drawings a fluid seal designated generally 10 made in accordance with and embodying a first form of the present invention. The seal 10 is shown in FIG. 1 in operative engagement with a rotatable member 12 such as a crankshaft of an internal combustion engine or the like. The rotatable element 12, as shown, is encompassed by portions of a cylinder block 14 and a bearing cap 16 suitably secured to the block 14 to maintain a bearing 18, such as a rear main bearing, in operative supportive association with the shaft 12.

A continuous circular groove 20 is provided in the cylinder block 14 and the bearing cap 16 to receive the seal 10. As shown in axial cross section in FIGS. 1 and 4, the groove 20 is trapezoidal in cross section, the left 22 and right 24 radially directed side walls of the groove 20 sloping towards each other and merging into a bottom wall 26 at corners 28 and 30. The groove 20 is usually cut into the cylinder block 14 and bearing cap 16 at the same time by a machine tool which cuts to precisely set dimensions, the cap 16 being secured to the block 14 temporarily for machining purposes. It has been found that such tool described in the block 14 and cap 16 virtually a perfect circular surface in regard to the bottom wall 26. Furthermore it has been found that the corners 28, 30 are maintained in a closely fixed dimensional relationship. In view of this situation it is highly desirable that the pre-formed associated fluid seal 10 conform as closely as practicable to the shape of the groove 20 for reasons to be set forth more fully hereinafter.

By the representations of FIGS. 5 and 6 it is to be understood that the seal 10 may be of "split-seal" or semi-annular type of construction which is well known in the art.

The largest portion of the seal 10 comprises an annular body 32 of elastomeric material such as neoprene (polychloroprene), Buna-N rubber (butadiene acrylonitrile copolymer) or silicone rubbers which possess the requisite elasticity and toughness to endure an environment of hot lubricating oil and prolonged frictional contact with a rotatable member. The body 32 is dimensioned to substantially and snugly fill the groove 20 and to project radially inwardly therefrom to present a sealing lip 34 toward the shaft 12 for fluid-tight engagement therewith, as shown in FIG. 4. More particularly, the lip 34 which comprises the inner annular periphery of the seal body 32 includes a circumferential recess 36 in one radial wall of the seal body 32, shown clearly in FIG. 2. In the unstressed condition, shown in broken lines in FIG. 4, the seal lip 34 is rather wedge-shaped in axial cross section. When deformed or stressed, as by contact with the rotatable member 12, the sealing lip 34 assumes an irregular shape to present a substantial surface for sealing engagement for the shaft 12, as shown in full lines in FIG. 4. At the side of the lip 34 opposite the recess 36 there is a circularly relieved portion 38 between the base of the lip and adjacent wall of the seal 10.

When the seal 10 is constructed as a "split-seal" the abutting pairs of ends of the respective seals may be constructed with interfering portions adjacent the sealing lip 34 as shown in FIGS. 5 and 6. This construction and arrangement is described in my co-pending application Serial Number 39,491, filed June 29, 1960, now U.S. Patent No. 3,106,406 dated October 8, 1960.

Supporting the sealing lip 34 and maintaining the seal 10 in predetermined dimensional configuration is an internally disposed circumferentially extending reinforcing element 40 and includes backbone portion 42 consisting of a U-shaped element in axial cross section which is medially disposed in the seal 10, the vertex of the backbone portion 42 being disposed beneath the sealing lip 34 providing a measure of support therefor. The medial or backbone portion 42 includes diverging wall members each of which terminate in a circumferentially extending, rim element 44, 46 respectively.

Each rim 44, 46 presents a broad surface towards the bottom wall 26 of the groove 20 when the seal 10 is disposed therein. More particularly, intermediate the bottom wall and the surface of the respective rims 44, 46 is a slight thickness of elastomeric material of the body 32. Being that the material is of slight thickness its compressibility is proportionately reduced and therefore the dimensions of the seal surrounding the rims 44 and 46 and the respective distal edges 48 and 50 thereof tend closely to conform to that of the reinforcing member 40. This is important for the reason that the dimensions of the groove 20 adjacent the bottom thereof must be complemented by those of the seal 10, this being effectuated best, as has been found, by thus constructing the seal 10.

In function, the relationship between the seal 10 and the groove 20 obviates to a great extent relative motion therebetween through the frictional engagement between the snugly fitting portions. The area of frictional engagement caused by the precise fitting of the seal 10 to the groove 20 is quite large along the outer periphery of the seal 10, i.e. that part of the seal most distant from its center. Thus there is provided a long moment arm cooperating with a great area to develop the reaction forces required to resist the rotatable stresses imparted to the seal 10 through frictional contact between the lip 34 of the shaft 12.

The seal 10 for example may have an axial dimension along the outer periphery of 5/16 inch where the seal is adapted to conform to a 3⅛ inch diameter rotatable journal. In this regard it is to be noted that the free edges 48, 50 of the rims 44, 46 are in proximate relationship to the respective side walls 22, 24 of the groove 20. Also to be recognized is that the sealing surface of the lip 34 is disposed to one side of the seal 10 thereby loading the seal in an unbalanced condition. This unbalanced loading is counteracted by the positioning of the edges 48, 50 as described above and thus tipping or tilting of the seal 10 in the groove 20 is materially reduced.

Due to the configuration of the reinforcing element 40 to a large area for bond between the element 40 and the elastomeric material 32 is afforded. The bond generated in this manner has been found to be substantially greater than that known to the use of reinforcing elements of circular cross section or the like.

This bond between the body 32, and the reinforcing element 40 is enhanced by a plurality of holes 52 in the center of the backbone element into which the body material extends. Further, circular notches 54, or the like, may be provided along the distal edges 48, 50 of the rims 44, 46 to reduce the likelihood of parting of the body material from the free edges by affording, together with the holes 52, an elastomeric key between the body 32 and the reinforcing element 40.

It has been found that when the reinforcing element 40 constructed of mild carbon steel or materials having similar properties, that an efficient and economical sealing structure results.

There is shown in FIG. 7 of the drawings a fluid seal designated generally 100 made in accordance with and embodying a second form of the present invention. The seal 100 is shown in FIG. 7 in operative engagement with a rotatable member 112 such as a crankshaft of an automobile engine or the like. The crankshaft 112, as shown, in its normal operative position is half-encompassed by portions of a cylinder block 114 and a bearing cap 116 suitably secured thereto by a spaced pair of cap screws 118 which straddles the crankshaft 112.

Referring particularly to FIG. 8, it will be seen that a continuous circular groove 120, similar to the groove 20 of the first form shown in FIGS. 1 and 4, is provided in the block 114 and bearing cap 116 to receive the seal 110. To the right (as shown in FIG. 8) of the groove 120 is a second groove 122 in which reposes an "oil-slinger" flange portion 123 of the crankshaft 112. On the rear main bearing cap 116 radially outwardly of the groove 120, is a semi-circular groove 124 which is adapted to receive a complementary rim of the engine's oil pan (not shown).

Referring now to FIGS. 9–12, it is to be understood that the seal 100 is of the "split-seal" construction well known in the art. Further, the seal 100 in many respects is similar to the previously described seal 10 in that the seal 100 incorporates the U-shape, or half corrugated shape, of the backbone section 40 embedded in elastomeric body material 32 previously described. Being that there are similarities between the seal 10 and the seal 100 similar parts bear similar numerals.

By way of emphasizing the differences in the seal 100 from that previously described herein, it will be seen from FIG. 9 that the free ends of each seal half contains an opening which is a portion of a continuous fissure 128 defined by the rubber shrouded side of the central backbone element 40. As to function, the seal halves of the split seal construction may be segregated into the first half 100a and a second half 100b. The seal half 100a is adapted to be disposed in the groove portion 120 carried by the engine block 114. On the other hand, the second portion 100b of the split seal 100 is adapted to be carried by the rear main bearing cap 116, and to this end the half 100b is provided in the fissure 128 with a wire element 130 which extends entirely around the outer periphery of the element 100b and projects from each end a short distance, the projection portion being designated 132.

The wire element or retainer member 130 frictionally engages within the fissure 128, the elastomeric material of the body member including such frictional engagement as may best be seen from FIG. 10.

From FIG. 12 in conjunction with FIG. 11 it will be seen that the projecting element 132 of the wire 130 is insertable and retainable in the fissure or groove 128 of the seal half 100a. Thus, when seal half 100a is inserted in the block 114 and the crankshaft 112 assembled therein, seal half 100b may be mounted with respect to the seal half 100a. In this position seal half 100b will be free-standing, whereby the bearing cap 116 may be inserted thereover, seal 100b being receivable in the groove 120 of the bearing cap 116. In this connection it is to be noted that the split seal 100 provides a locating function for the bearing cap 116 with respect to the block 114. Of course, when engine assembly is in progress the block and bearing cap structures are normally in a position reversed from that shown in FIGS. 7 and 8, i.e., the engine is upside down.

The foregoing construction of oil seal permits the bearing cap 116 to be narrower axially along the crankshaft 112. This fact obtains being that there is no dowel pin requirement to be interposed between the cap 116 and block 112 and from the fact that seal element 100 is narrower than the Oakum or impregnated fiber type seals which have been used heretofore.

While there has been described what is at present considered to be a preferred embodiment of the invention, it will be understood that the modifications may be made therein, and it is intended to cover in the appended claims all such modifications as fall within the true spirit and scope of the invention.

What is claimed is:

1. A seal for preventing seepage of fluid from a housing having a circular opening through which a rotatable shaft concentrically projects, such housing having an annular groove therein opening towards such shaft, said seal comprising: a pair of semi-circular sealing members each including a substantially U-shaped metallic reinforcing element opening radially outwardly and having a pair of diverging sidewalls; a pair of semi-circumferential rims are united with one sidewall of said U-shaped element and together span substantially the axial width of said seal; an elastomer element bonded to said reinforcing element and adapted to engage the walls of such groove and form a seal therewith, said elastomer element having a portion adapted to project radially inwardly from such groove, said portion presenting a sealing lip towards such rotatable shaft for sealing engagement therewith, and means forming an elastomeric key between said reinforcing element and said elastomer element.

2. A seal for preventing seepage of fluid from a housing having a circular opening through which a rotatable shaft concentrically projects, such housing having an annular groove therein opening towards such shaft, said seal comprising: a pair of semi-circular sealing members each including a metallic reinforcing element U-shaped in cross section to open radially outwardly, a pair of semi-circumferential rims each united to one arm of said U-shaped element and together spanning substantially the axial width of said seal, an elastomer element bonded to said reinforcing element and adapted to engage the walls of such groove and form a seal therewith, said elastomer element having a portion adapted to protrude radially inwardly from such groove, said portion presenting an axially cantilevering sealing lip toward such rotatable shaft for sealing engagement therewith, and means forming an elastomeric key between said reinforcing element and said elastomer element.

3. A seal for preventing seepage of fluid from a housing having a circular opening through which a rotatable shaft concentrically projects, such housing having an annular groove therein opening toward such shaft, said seal comprising: a pair of semi-circular sealing members each including a semi-circumferential U-shaped metallic reinforcing element opening radially outwardly; a pair of rims each united to one arm of said semi-circumferential U-shaped element and spanning substantially the axial width of said seal, an elastomer element bonded to said reinforcing element and extending over said rims for engagement with the walls of such groove to form a seal therewith, said reinforcing element having a plurality of apertures therein, said elastomer element having portions thereof extending through said apertures to form an interlocking connection, and sealing lip means extending along the inner periphery of such seal for engagement with such rotatable shaft to form a seal therewith.

4. A seal for preventing seepage of fluid from a housing having a circular opening through which a rotatable shaft concentrically projects, such housing having an annular groove therein opening toward such shaft, such groove having a bottom wall substantially smooth between the bottom corners thereof, such corners being spaced axially apart a predetermined distance, said seal comprising: a circular body of elastomeric material dimensioned to substantially fill such groove and having a sealing lip adapted to protrude radially inwardly from such groove to engage such shaft in a leak-tight relationship; and a rigid, circular, reinforcing member encased by said body of elastomeric material to maintain the shape and important dimensions of said seal, said reinforcing member including a pair of circumferentially extending, distal edges, each being disposed in said body to lie closely adjacent to one of such corners of the groove when said seal is disposed therein, thereby to maintain a fixed dimensional relationship between such corners and the axial width of said seal adjacent the outer periphery thereof.

5. The seal set forth in claim 4 wherein each of said pair of distal edges is respectively disposed on a circular, rim-like element having an axially extending support surface closely underlying the outer periphery of said seal body to maintain the circularity thereof to conform with the bottom wall of such groove.

6. The seal set forth in claim 5 wherein a proximal edge portion of each rim is rigidly united to a radially directed medial web of said reinforcing member, said web being U-shaped in radial cross section.

7. A seal for preventing seepage of oil from a housing comprising first and second housing members which when drawn together form a circular opening through which a rotatable shaft concentrically projects, such housing having an annular seal-support groove therein opening toward such shaft, said seal comprising: first and second semi-circular seal bodies of elastomeric material, each body having a pair of ends, said bodies respectively being received in such first and second housing members in the annular groove therein, and projecting radially inwardly therefrom for engagement with such rotatable shaft, each said body having a semi-circular reinforcing member generally U-shaped in cross section and opening radially outwardly to define a fissure along the outer periphery of said body between said pair of ends thereof, one of said seal bodies at each end thereof having a seal aligning element projecting outwardly therefrom and into the fissure of the other seal body at the respective adjacent end thereof.

8. A seal for preventing seepage of oil from a housing comprising first and second members which when drawn together form a circular opening through which a rotatable shaft concentrically projects, such housing having an annular seal-support groove therein opening towards such shaft, said seal comprising: first and second semi-circular seal bodies of elastomeric material, each body having a pair of ends, said bodies respectively being received in said first and second housing members in the annular groove therein, and projecting radially inwardly therefrom for engagement with such rotatable shaft, each said body having a semi-circular reinforcing member generally U-shaped in cross section and opening radially outwardly to define a fissure along the outer periphery of said body between said pair of ends thereof, one of said seal bodies at each end thereof having a seal aligning element disposed in the fissure of said body and projecting outwardly therefrom into the fissure of the other of said body at the respective adjacent end thereof.

9. A seal for preventing seepage of oil from a housing comprising first and second housing members which when drawn together form a circular opening through which a rotatable shaft concentrically projects, such housing having an annular seal-support groove therein opening towards such shaft, said seal comprising: first and second semi-circular seal bodies of elastomeric material, each body having a pair of ends, said bodies respectively being received in such first and second housing members of the annular groove therein, and projecting radially inwardly therefrom for engagement with such rotatable shaft, each body having a semi-circular reinforcing member generally U-shaped in cross section and opening radially outwardly to define a groove along the outer periphery of said body between said pair of ends thereof; and an elongated, curved element frictionally retained in the groove of one of said bodies and extending therealong and having a projecting portion extending from each end of said one body, whereby said curved element projecting portion aligns said sealed bodies in operative closed-circle relationship with said projecting portion extending into the groove of said other body.

References Cited by the Examiner
UNITED STATES PATENTS

| | | | |
|---|---|---|---|
| 2,474,713 | 6/49 | Brenneke | 277—167 |
| 2,647,002 | 7/53 | Brummer | 277—214 |
| 2,719,743 | 10/55 | Brummer et al. | 277—206 XR |
| 2,723,142 | 11/55 | Smith | 277—218 |
| 3,027,167 | 3/62 | Liebig | 277—199 XR |

FOREIGN PATENTS 679,673  8/39  Germany.

EDWARD V. BENHAM, *Primary Examiner.*

SAMUEL ROTHBERG, *Examiner.*